(12) United States Patent
Tinkler et al.

(10) Patent No.: US 9,510,706 B2
(45) Date of Patent: Dec. 6, 2016

(54) BEVERAGE FORMING DEVICE WITH ACTIVATION BUTTON

(71) Applicant: Keurig Green Mountain, Inc., Waterbury, VT (US)

(72) Inventors: Ian Tinkler, Wakefield, MA (US); James E. Shepard, Marblehead, MA (US)

(73) Assignee: Keurig Green Mountain, Inc., Waterbury, VT (US)

( * ) Notice: Subject to any disclaimer, the term of this patent is extended or adjusted under 35 U.S.C. 154(b) by 156 days.

(21) Appl. No.: 14/448,500

(22) Filed: Jul. 31, 2014

(65) Prior Publication Data

US 2014/0342069 A1 Nov. 20, 2014

Related U.S. Application Data

(63) Continuation of application No. PCT/US2013/024734, filed on Feb. 5, 2013.

(60) Provisional application No. 61/597,017, filed on Feb. 9, 2012.

(51) Int. Cl.
*A47J 31/40* (2006.01)
*A47J 31/36* (2006.01)
*A47J 31/44* (2006.01)
*A23F 3/18* (2006.01)
*A23F 5/26* (2006.01)

(52) U.S. Cl.
CPC ............... *A47J 31/407* (2013.01); *A23F 3/18* (2013.01); *A23F 5/262* (2013.01); *A47J 31/3633* (2013.01); *A47J 31/4407* (2013.01)

(58) Field of Classification Search
CPC .... A47J 31/407; A47J 31/3633; A47J 31/4407
See application file for complete search history.

(56) References Cited

U.S. PATENT DOCUMENTS

2005/0126399 A1* 6/2005 Bragg ................. A47J 31/0673
99/279

FOREIGN PATENT DOCUMENTS

| CA | 2536284 A1 | 8/2007 |
| CN | 1942126 A | 4/2007 |
| CN | 201341791 Y | 11/2009 |

(Continued)

OTHER PUBLICATIONS

International Search Report and Written Opinion dated Apr. 4, 2013 from corresponding PCT Application No. PCT/US2013/024734.

(Continued)

*Primary Examiner* — Anthony Weier
(74) *Attorney, Agent, or Firm* — Wolf, Greenfield & Sacks, P.C.

(57) ABSTRACT

A beverage forming system and method in which an activation button is arranged on a movable cartridge holder. A beverage forming system may include a cartridge holder movably mounted to a frame and having an opening to receive a cartridge such that the cartridge holder is arranged to hold and move a cartridge between an open position and a closed position. An activation button may be mounted on a top of the cartridge holder with the cartridge holder in the closed position, allowing easy access to the button once the cartridge holder is closed. Operation of the activation button may cause the system to begin a beverage forming process that includes introducing fluid to the cartridge via an inlet.

11 Claims, 10 Drawing Sheets

(56) References Cited

FOREIGN PATENT DOCUMENTS

DE            19959504 A1    6/2001
WO     WO 2008075175 A2    6/2008
WO     WO 2011144719 A1   11/2011

OTHER PUBLICATIONS

Office Action mailed Feb. 15, 2016 for Application No. CN201380018394.7.

* cited by examiner

BEVERAGE FORMING DEVICE WITH ACTIVATION BUTTON

CROSS REFERENCE TO RELATED APPLICATIONS

This application is a continuation of International Application No. PCT/US2013/024734, filed Feb. 5, 2013, which claims the benefit of U.S. Provisional Application No. 61/597,017, filed Feb. 9, 2012, each of which is hereby incorporated by reference in its entirety.

BACKGROUND

1. Field of Invention

This invention relates to beverage forming systems, such as coffee brewers that use a disposable beverage cartridge to form a coffee beverage.

2. Related Art

Beverage forming systems that use a disposable beverage cartridge for forming a beverage are well known. For example, U.S. Pat. No. 7,165,488 discloses a beverage making device that uses a cartridge for making a coffee drink or other beverage. The device includes a cartridge receptacle that is movable between a forwardly inclined position, in which a user can place a cartridge in, or remove a cartridge from, the receptacle, and a vertical position in which the receptacle may cooperate with a lid to form a beverage using the cartridge.

SUMMARY OF INVENTION

Aspects of the invention provide for a cartridge holder that is movable between an open position in which the cartridge holder is in an upwardly inclined orientation to receive a cartridge and a closed position in which the cartridge holder is in a downwardly inclined orientation. This is in contrast to most, if not all, cartridge holders in which the holder is typically oriented in an at least somewhat upward orientation both in the open and closed position, e.g., to help retain the cartridge in the holder.

In one aspect of the invention, a beverage forming system includes a frame arranged to support portions of the beverage forming system, and a cartridge holder movably mounted to the frame and having an opening to receive a cartridge such that the cartridge holder is arranged to hold and move a cartridge between an open position and a closed position. A cover may be arranged to at least partially cover the opening of the cartridge holder with the cartridge holder in the closed position, and the cover may be positioned away from the opening with the cartridge holder in the open position. An inlet may be arranged to provide fluid to a cartridge held by the cartridge holder in the closed position for the formation of a beverage, and an activation button may be mounted on a top of the cartridge holder with the cartridge holder in the closed position. Operation of the activation button may cause the system to begin a beverage forming process that includes introducing fluid to the cartridge via the inlet.

In some embodiments, the cartridge holder includes a handle that is manipulable by a user to move the cartridge holder between the open and closed positions, and the activation button may be adjacent the handle. Also, the cartridge holder may be arranged so that pushing down on the cartridge holder relative to the frame moves the cartridge holder relative to the frame from the open to the closed position. With the activation button positioned on the cartridge holder, this arrangement may allow for easy and intuitive activation of the system to make a beverage.

In some embodiments, with the cartridge holder in the open position, the opening of the cartridge holder may be oriented in an upwardly inclined position to receive the cartridge. Also, with the cartridge holder in the closed position, the opening of the cartridge holder may be oriented in a downwardly inclined position. For example, the opening may have an axis that is perpendicular to a plane of the opening, and arranged at an angle of about 30-50 degrees above the horizontal with the cartridge holder in the open position, and arranged at about 0-20 degrees below the horizontal with the cartridge holder in the closed position.

In some embodiments, the system may include a housing attached to the frame that encloses components of the system, with the housing defining a cavity that receives the cartridge holder in the closed position. However, the cartridge holder may be exposed outside of the cavity in the open position. For example, a top portion of the cartridge holder may be flush with a top portion of the housing with the cartridge holder in the closed position, and the activation button may be arranged at an uppermost portion of the system with the cartridge holder in the closed position.

In another aspect of the invention, a method for making a beverage includes placing a beverage cartridge in an opening of a cartridge holder of a beverage making system, moving the cartridge holder and the beverage cartridge to a closed position to at least partially enclose the beverage cartridge, activating a button on the cartridge holder to cause the beverage making system to start a beverage making process, introducing liquid to the cartridge to form a beverage, and receiving beverage from the beverage cartridge.

As discussed above, in some embodiments, the step of moving may include pushing downwardly on the cartridge holder, e.g., by pushing a handle attached to the cartridge holder. Also, the step of activating may include pushing an activation button that is adjacent to the handle. In some embodiments, the step of moving includes moving the opening of the cartridge holder from an upwardly inclined position to a downwardly inclined position. In some cases, the activation button is mounted to a top portion of the cartridge holder, and the step of moving includes moving the cartridge holder into a cavity defined by a housing of the beverage making system so that a top portion of the cartridge holder is flush with a top portion of the housing with the cartridge holder in the closed position. Thus, the button may be arranged at an uppermost portion of the system with the cartridge holder in the closed position.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to certain illustrative embodiments and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
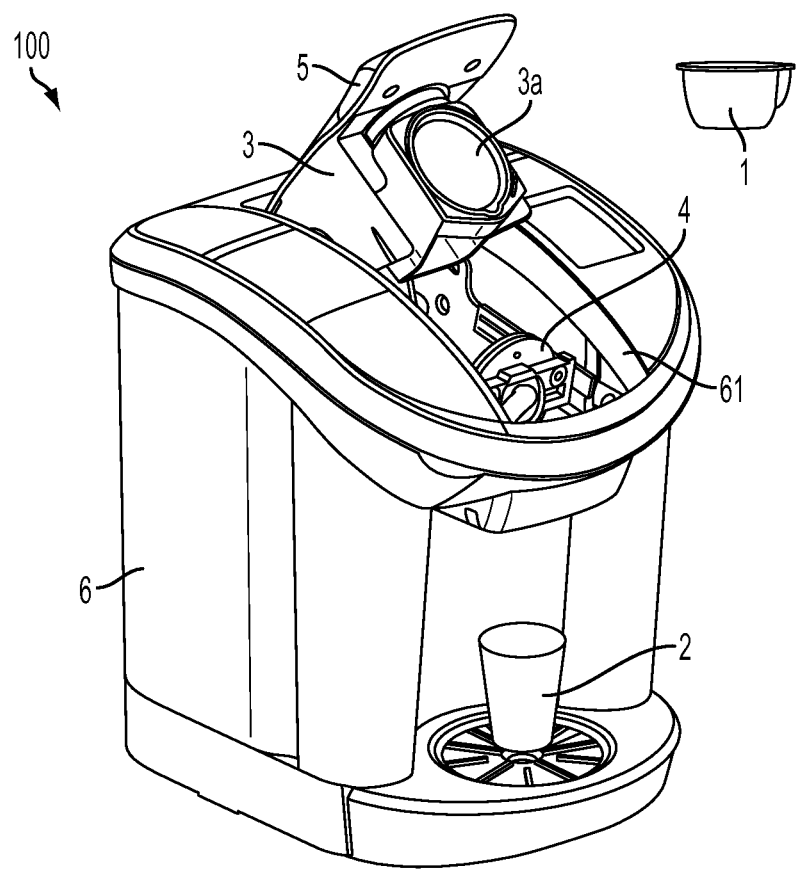
FIG. 1 is a perspective view of a beverage forming system with a cartridge holder in an open position in an illustrative embodiment.

FIG. 1 shows a perspective view of a beverage forming system 100. Although the beverage forming system 100 may be used to form any suitable beverage, such as tea, coffee, other infusion-type beverages, beverages formed from a liquid or powdered concentrate, soups, juices or other beverages made from dried materials, or other, in this illustrative embodiment, the system 100 is arranged to form coffee or tea beverages. As is known in the art, a beverage cartridge 1 may be provided to the system 100 and used to form a beverage that is deposited into a user's cup or other suitable container 2. The cartridge 1 may be manually or automatically placed in a cartridge receiver that includes a cartridge holder 3 and cover 4 in this embodiment of the beverage forming system 100. For example, the holder 3 may be or include a circular, cup-shaped or otherwise suitably shaped opening in which the cartridge 1 may be placed. In this embodiment, the cartridge holder 3 includes an opening 3a that is arranged to receive the cartridge 1. While in this embodiment the opening 3a is sized and shaped so as to engage with an upper portion of the cartridge 1, the opening 3a may be arranged in other ways, e.g., to engage with a lower portion, side, bottom or other part of the cartridge 1. With a cartridge 1 placed in the cartridge holder 3, a handle 5 may be moved by hand so as to move the cartridge holder 3 to a closed position. In the closed position, the cover 4 at least partially covers the opening 3a, e.g., to at least partially enclose the cartridge 1 in a chamber in which the cartridge is used to make a beverage. For example, with the cartridge 1 held by the cartridge holder 3 in the closed position, water or other liquid may be provided to the cartridge 1 (e.g., by injecting the liquid into the cartridge interior) to form a beverage that exits the cartridge 1 and is provided to a cup 2 or other container.

In accordance with one aspect of the invention, the cartridge holder 3 may be movably mounted to a frame (e.g., which includes a housing 6 which is arranged to enclose at least some components of the system 100) and arranged to hold and move a cartridge between an open position in which the opening of the cartridge holder (or a lid of a cartridge) is oriented in an upwardly inclined position to receive the cartridge, and a closed position in which the opening (or a lid of a cartridge) is oriented in a downwardly inclined position. That is, when the cartridge holder 3 is in the open position, the holder may be oriented in an upwardly inclined position, e.g., so that a plane of the opening 3a of the holder 3 faces generally upwardly and at an angle to the horizontal. In one arrangement shown in FIG. 2, the opening may have an axis 101 that is perpendicular to a plane of the opening 3a, and the axis 101 may be arranged at an angle of about 30-50 degrees above the horizontal with the cartridge holder in the open position, although other angles between 0-90 degrees are possible in some embodiments. This arrangement may provide two features: 1) the opening 3a may be presented in a way that allows for easy placement and/or removal of a cartridge 1 with respect to the holder 3, and 2) the holder 3 may hold the cartridge 1 in the open position without the cartridge 1 falling from the opening 3a. As shown in FIG. 3, with the cartridge holder 3 in the closed position the opening 3a may be oriented in a downwardly inclined position. For example, in the closed position the axis 101 of the opening 3a in this embodiment may be arranged at about 10-20 degrees below the horizontal, although other angles between 0-90 are possible. Orienting the cartridge 1 in this way may provide features such as: 1) for cartridges having a cup-like container and a piercable lid, arranging the piercable lid of the opening downwardly to allow beverage in the cartridge to drain more fully from the cartridge (e.g., where the lid, but not the container, is pierced), 2) allowing the cartridge interior to be better flooded with liquid so the liquid can fully interact with a beverage medium in the cartridge, 3) allowing contents of a cartridge 1 to be "dumped" from the cartridge (e.g., where a lid is pierced or removed from the cartridge and a drink mix or other beverage medium is dumped from the cartridge and into a mixing chamber, the cup 2 or other receptacle), 4) allowing for easier cartridge ejection (e.g., where a cover 4 or other component that holds the cartridge in place in the holder 3 is removed, allowing the cartridge 1 to fall from the holder 3 for ejection), and others.

Another aspect of the invention relates to having the housing define a cavity 61 (see FIG. 1) arranged to receive the cartridge holder 3 when the holder 3 is in the closed position. Thus, in the open position the cartridge holder 3 may be positioned outside of the cavity 61, but in the closed position, the holder 3 may be received into the cavity 61. This arrangement may provide for a more compact system 100 when the cartridge holder 3 is in the closed position and/or may help shield the cartridge holder 3 from a user during system operation, e.g., in case hot water is sprayed from a cartridge during beverage formation.

In another aspect of the invention, the cartridge holder and cover are arranged so that pushing down on the cartridge holder relative to the frame 6 moves the cartridge holder 3 from the open to the closed position and causes the cover 4 to at least partially cover the opening. That is, in this illustrative embodiment, a user may simply push down on the handle 5 of the cartridge holder 3 to move the cartridge holder 3 to the closed position. (In this illustrative embodiment, the handle 5 is fixed relative to the cartridge holder 3, and so pushing down on the handle 5 also pushes down on the cartridge holder 3. Other handle arrangements are possible, particularly with respect to other aspects of the invention, e.g., where a handle 5 is rotatable relative to a cartridge holder 3.) This feature provides the system 100 with a simplicity of construction and operation with respect to opening and closing for making beverages. While some embodiments in accordance with aspects of the invention may include linkages, motors, and other relatively complicated arrangements for moving the cartridge holder 3, in this illustrative embodiment a user need only push down on the cartridge holder 3 to move it to the closed position, and lift the cartridge holder 3 to move it to the open position. This arrangement can make the system more intuitive for the user to use, e.g., a natural way to close an item, such as a door, is to push on the item so as to move it to the closed position. In this way, this aspect of the invention may make use of the system 100 easier and less complicated.

While in this embodiment a user may push down on the cartridge holder 3 to close it, and lift up on the cartridge holder 3 to open it, other arrangements in accordance with this aspect of the invention are possible. For example, while a user may push down on the cartridge holder 3 to move it to the closed position, such movement may charge a spring-loaded system and engage a latch that keeps the cartridge holder 3 in the closed position until the system 100 automatically releases the latch, allowing the cartridge holder 3 to move upwardly to the open position without interaction by the user. Such opening of the cartridge holder 3 could be triggered, for example, by a user pressing a button or otherwise indicating a desire to make a beverage. Also, while in this embodiment the cartridge holder 3 moves pivotally relative to the frame 6, other arrangements are possible, such as having the cartridge holder 3 move vertically relative to the frame 6, move vertically and pivotally relative to the frame 6, etc.

In another aspect of the invention, the cover, which may at least partially cover the opening of the cartridge holder with the cartridge holder in the closed position and be positioned away from the opening with the cartridge holder in the open position, may be arranged to move with the cartridge holder in at least a portion of the cartridge holder movement between the open and closed positions. For example, as the cartridge holder moves from the open position to the closed position, the cover may move with the cartridge holder during a portion of the cartridge holder's movement, e.g., to help ensure that the cartridge does not fall from the cartridge holder and/or to help one or more piercing elements on the cover to properly engage with the cartridge. As discussed above, in one embodiment, the cartridge holder may move from an open position in which the opening is oriented in an upwardly inclined position to a closed position in which the opening is oriented in a downwardly inclined position. In such movement, the cartridge may be at risk of falling from the opening unless some feature is provided to help keep the cartridge engaged with the cartridge holder. While other arrangements are possible (such as a friction fit of the cartridge with the holder, retainer tabs on the holder, etc.), in one aspect of the invention, the cover may move with the cartridge holder in a portion of its movement to help keep the cartridge engaged with the holder. For example, in one embodiment, the cover may engage with the cartridge and at least partially cover the opening of the holder prior to the holder reaching the closed position. In this way, the system may ensure that the cartridge is properly engaged with the cartridge holder and cover before the holder reaches the closed position. Also, or alternately, pivotal movement of the cover with the cartridge holder while the cartridge holder moves pivotally to the closed position may allow the cover to move linearly or axially relative to the holder, e.g., to allow piercing elements on the cover to properly engage the cartridge to allow the introduction of liquid into the cartridge or receiving of beverage from the cartridge. Otherwise, linear or axial movement of the cover relative to the cartridge and cartridge holder while the holder moves pivotally may cause piercing elements on the cover to tear a slit into the cartridge or otherwise improperly engage with the cartridge.

Figure 2:
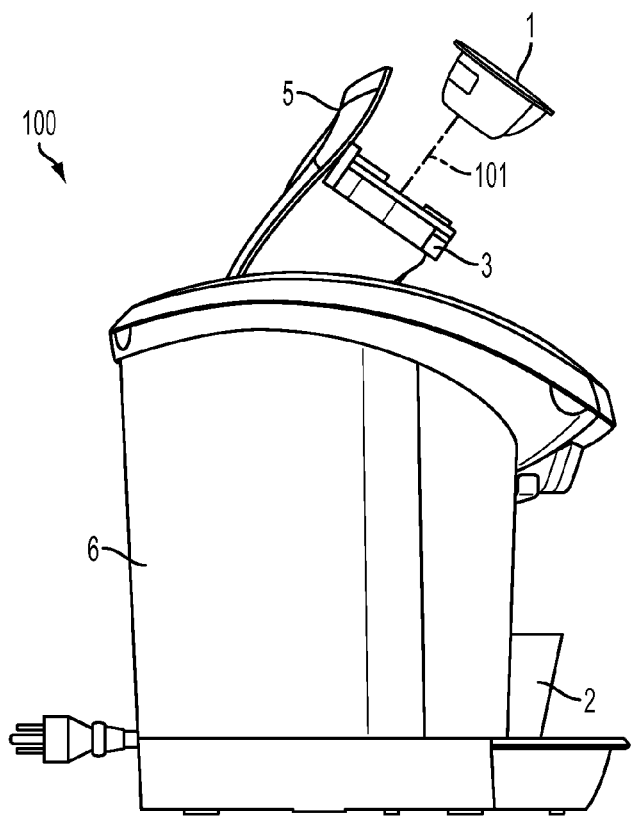
FIG. 2 is a side view of the beverage forming system of FIG. 1 with the cartridge holder in an open position.
Figure 3:
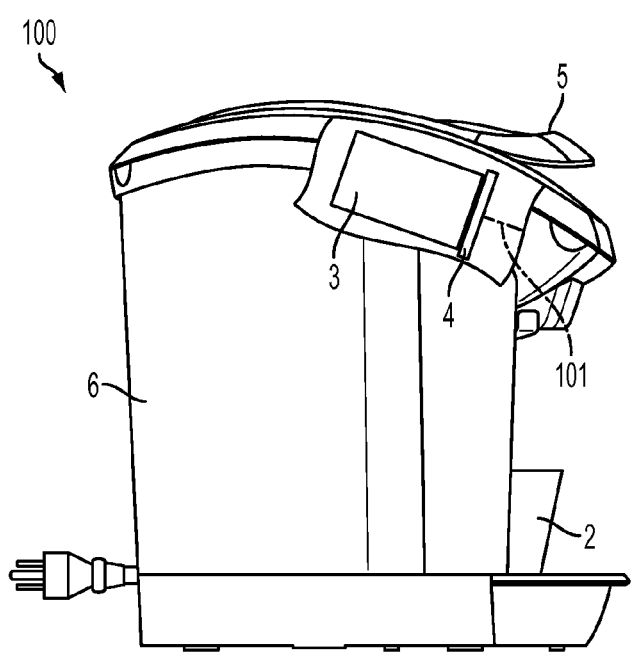
FIG. 3 is a side view of the beverage forming system of FIG. 1 with the cartridge holder in a closed position.
Figure 4:
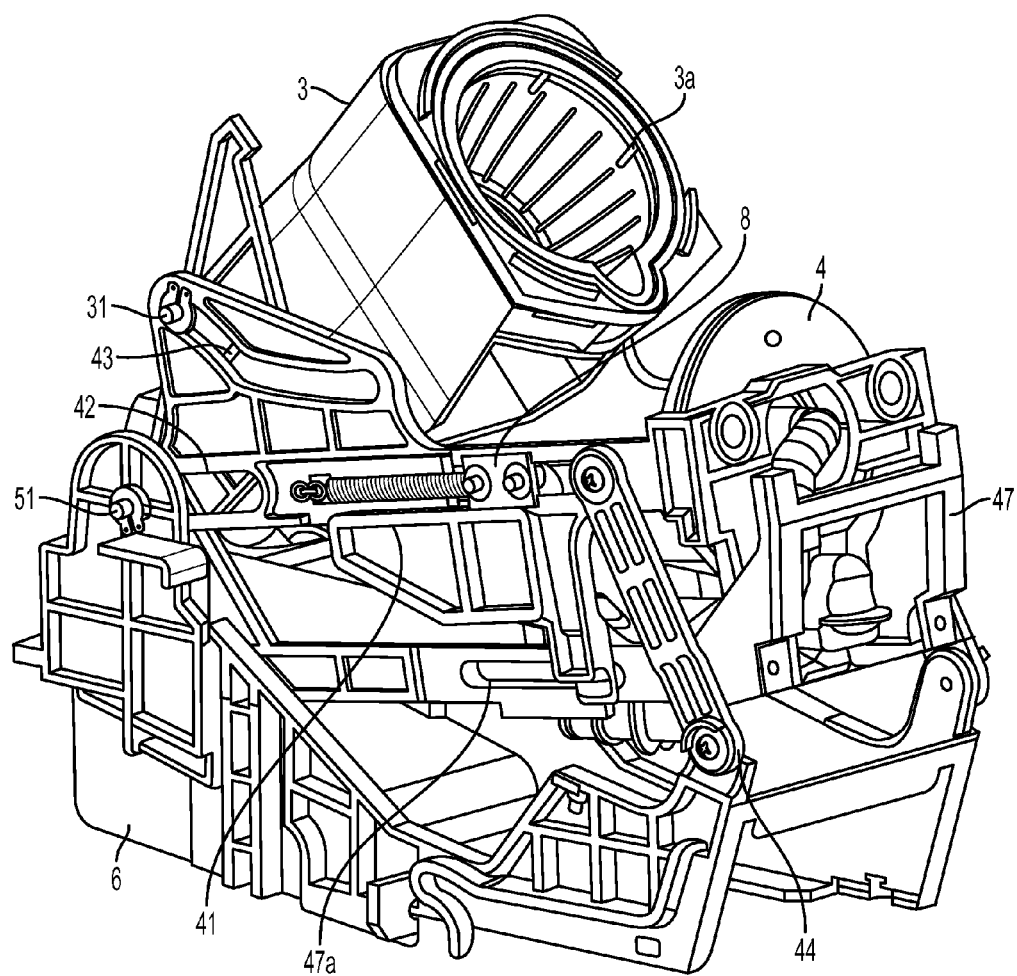
FIG. 4 is a perspective view of a cartridge holder and cover mounting arrangement in an illustrative embodiment with the cartridge holder in an open position.

FIG. 4 shows a perspective view of illustrative embodiment of a cartridge receiver that may be used in the FIGS. 1-3 embodiment. While a cartridge receiver that incorporates aspects of the invention could be arranged in different ways, in this embodiment the cartridge holder 3 is pivotally mounted to the frame 6 by a pivot pin 51 so that the cartridge holder 3 can move pivotally between an open position (shown in FIG. 4) and a closed position. The cover 4 is mounted to a carrier 41 that is movably mounted relative to the frame 6 at the pivot pin 51 and is slidably mounted to a base 47. Specifically, a slot 42 of the carrier 41 engages with the pin 51 so that the carrier 41 can move pivotally as well as linearly along the slot 42 relative to the frame 6. The carrier 41 can also slide along grooves 47a in the base 47. Like the cartridge holder 3, the base 47 is pivotally mounted to the frame at the pivot pin 51 so that the base 47 can pivot relative to the frame 6. The carrier 41 has a cam slot 43 that engages with a cam follower 31 (e.g., a fixed pin) on the cartridge holder 3. As is explained in more detail below, the cam slot 43 and cam follower 31 engage the carrier 41 and holder 3 (and thus engage the base 47 and the holder 3) together so that movement of the holder 3 causes movement of the carrier 41 (and the base 47). A pair of links 44 are pivotally connected between the frame 6 and the carrier 41. The links 44 cause movement of the carrier 41 along the slot 42 to cause the cover 4 to move toward and away from the opening 3a of the holder 3. The links 44 also help limit the pivotal movement of the carrier 41 and base 47 in an upward direction.

Figure 5:
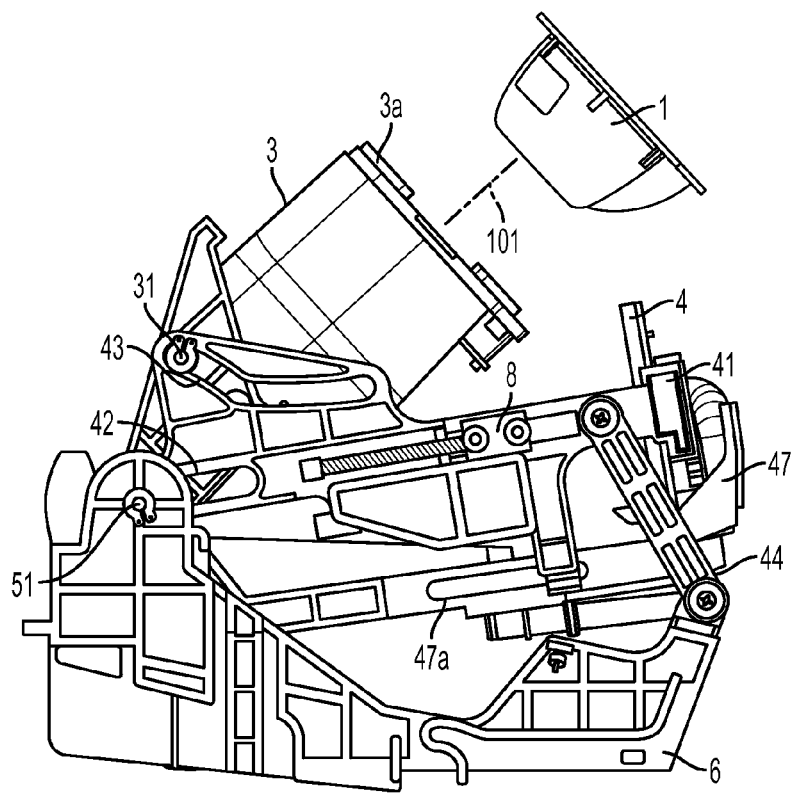
FIG. 5 is a side view of the arrangement of FIG. 4 with the cartridge holder in an open position.

Movement of the cartridge holder 3, cover 4 and carrier 41, and base 47 between the open and closed positions is described with reference to FIGS. 5-7. FIG. 5 shows a side view of the assembly of FIG. 4 with the cartridge holder 3 in the open position, and the opening 3a positioned upwardly away from the cover 4 and carrier 41 in an upwardly inclined position ready to receive a cartridge 1, or to have a cartridge 1 removed from the holder 3. The carrier 41 is moved forwardly relative to the base 47 (along the grooves 47a) and the frame 6 (along the slot 42) so that the pin 51 is located at a leftmost (rear) end of the slot 42. Also, the cam follower 31 of the holder 3 is located at an upper end of the cam slot 43, and thus the carrier 41 and base 47 are located at an upwardmost position relative to the frame 6. From the condition shown in FIG. 5, the cartridge holder 3 can be moved downwardly, e.g., pivoted relative to the frame 6 about the pin 51, toward the carrier 41 and base 47. During this initial portion of movement toward the closed position, the cam follower 31 slides along the cam slot 43, which is shaped so that the carrier 41 and base 47 remain generally stationary relative to the frame 6.

Figure 6:
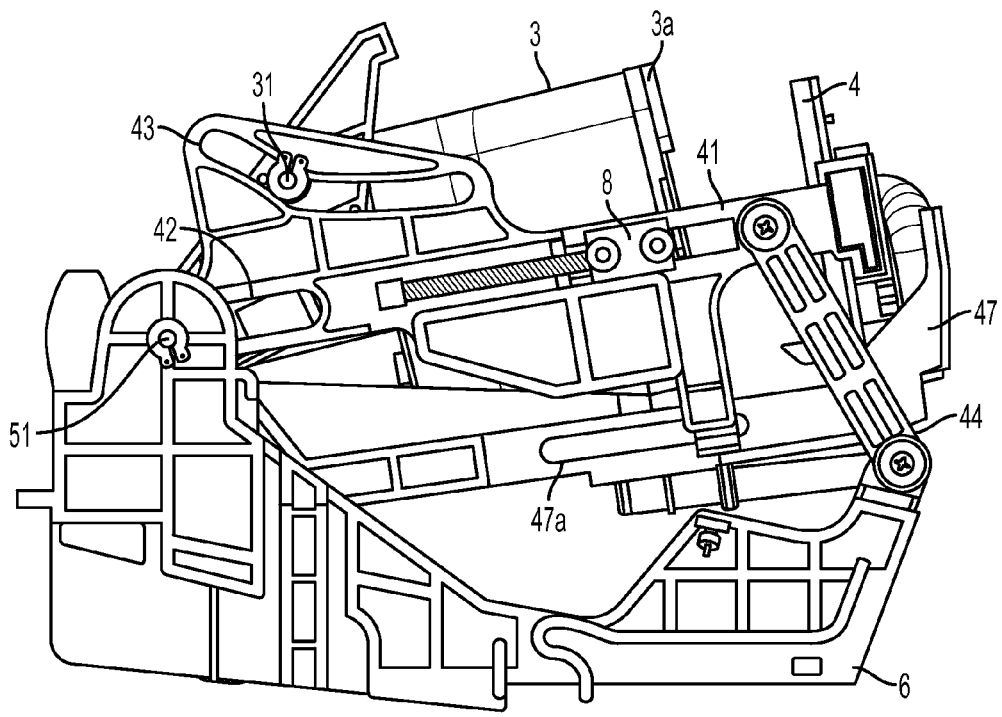
FIG. 6 is a side view of the arrangement of FIG. 4 with the cartridge holder in an intermediate position.

At an intermediate point between the open and closed positions as shown in FIG. 6, the cartridge holder 3 is pivoted downwardly and received into a space of the carrier 41 so that the opening 3a is opposed to the cover 4. This intermediate position may be reached, for example, when the axis 101 is near the horizontal, such as at an angle within about 0-10 degrees of horizontal. At this point, the shape of the cam slot 42 changes so that further movement of the holder 3 downwardly toward the closed position also causes the carrier 41 (and cover 4), and the base 47, to move downwardly. (With respect to pivotal movement around the pin 51, the base 47 and carrier 41 move together. However, the carrier 41 is arranged to slide rearwardly/forwardly relative to the base 47, as discussed above.) In this embodiment, the cam slot 42 is shaped so that the carrier 41 and cover 4 move with the cartridge holder 3 toward the closed position. As a result, the cover 4 will remain opposed to the opening 3a as the cover 4, carrier 41, base 47 and holder 3 move downwardly and pivotally relative to the frame 6 to the closed position. This downward motion of the carrier 41 also causes movement of the links 44 that pushes the carrier 41 rearwardly (toward the left in the figure) relative to the base 47 and frame 6. That is, downward movement of the carrier 41 causes the links 44 to move counterclockwise about their connection point to the frame as viewed in FIG. 6, which pushes the carrier 41 to the left so that the slot 42 slides along the pin 51 and the carrier 41 slides along the grooves 47a of the base 47. This movement causes the cover 4 to move toward the opening 3a. As a result, the cover 4 may engage, or move toward engagement with, the cartridge 1 in the holder 3, e.g., to help hold the cartridge 1 in place. Thus, the cover 4 may function as a retainer to help keep the cartridge 1 in place in the holder 3. Thus, even though the cartridge holder 3 may move so that the opening 3a approaches a downwardly inclined position, the cover 4 may help keep the cartridge 1 in place in the holder 3. Also, while not required, the cover 4 in this embodiment includes piercing elements 45, 46 that are arranged to pierce the cartridge 1 as the cover 4 moves toward the opening 3a. As described in more detail below, piercing of the cartridge by the elements 45, 46 may allow liquid to be delivered to the cartridge 1 and/or beverage to be received from the cartridge 1, but such piercing elements are not required.

Figure 7:
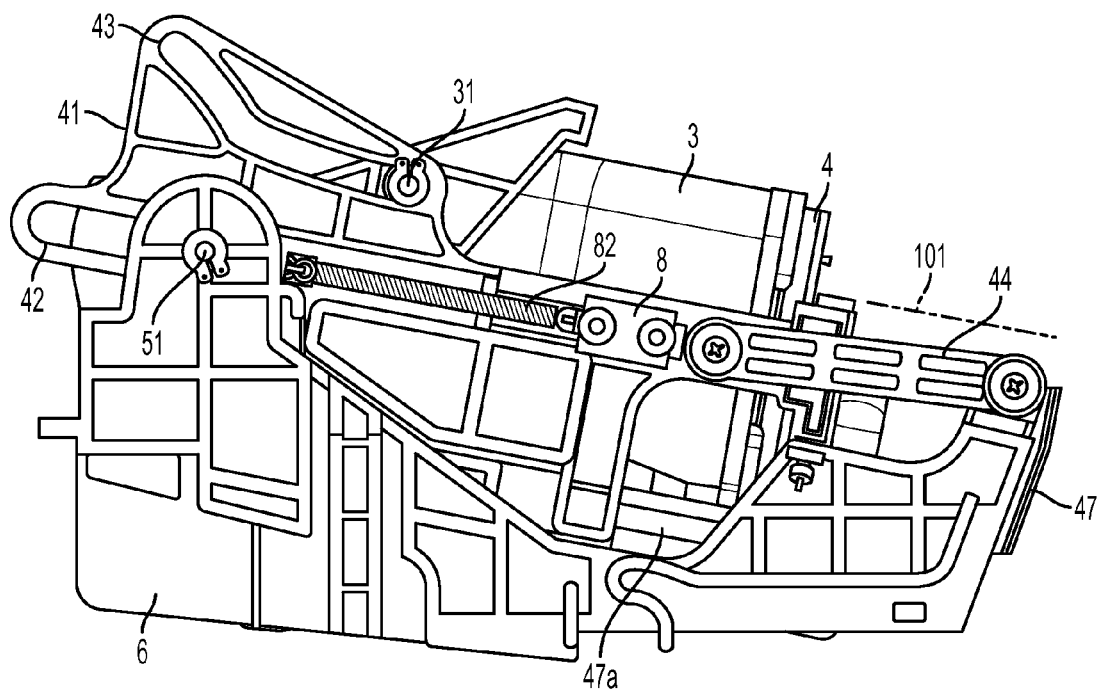
FIG. 7 is a side view of the arrangement of FIG. 4 with the cartridge holder in a closed position.

FIG. 7 shows the cartridge holder 3 in the closed position. In this position, the carrier 41 is slid rearwardly to the left along the slot 42 so the pin 51 is located near a front end of the slot 42 and the cartridge holder 3 is brought down into contact with at least a portion of the base 47. With the carrier 41 moved rearwardly, the cover 4 is arranged to at least partially cover the opening 3a, e.g., so as to contact the cartridge 1 and hold the cartridge in place. The cover 4 may engage with the cartridge and/or the holder 3 so as to form a seal (either with the cartridge, the holder 3, or both) so that a leak-free connection can be made between the cover and the cartridge or holder 3. As will be appreciated, the arrangement in which the links 44 are nearly aligned with the slot 42 and pin 51 allows the links 44 to provide good mechanical advantage to the movement of the cover 4 towards the holder 3, allowing the cover 4 to engage the cartridge 1 or holder 3 with a strong clamping force. Thus, with relatively modest downward force applied by a user on the holder 3, the cover 4 can be caused to clamp tightly against the cartridge and/or holder 3 This clamping arrangement may be exploited to create a leak-free connection that helps prevent liquid and/or beverage from leaking from the cartridge or holder 3 at the junction with the cover 4.

Movement of the cartridge holder 3 from the closed position to the open position is the reverse of the relative motions from the open position to the closed position. That is, upon lifting of the cartridge holder 3 upwardly from the closed position, the carrier 41 and cover 4 (and base 47) move rotationally with the cartridge holder 3 about the pin 51, while the links 44 cause the carrier 41 and cover 4 to be moved forwardly so the cover 4 moves away from the opening 3a. At the intermediate position of FIG. 6, the carrier 41 and cover 4 (and base 47) stop upward movement (at least in part by the action of the links 44 and the cam slot 43 and follower 31) and the cartridge holder 4 moves upwardly to the open position alone. Since the piercing elements 45, 46 are disengaged from the cartridge 1 at the intermediate position, the cartridge and cartridge holder 3 are free to move upwardly and away from the cover 4 without interference.

Of course, other embodiments, such as one in which the cover 4 does not include piercing element 45, 46, but rather inlet and/or outlet ports that are flush with the cover surface confronting the cartridge 1, the cover 4 need not move with the cartridge holder 3 in any portion of its movement. Instead, the cover may remain fixed and stationary relative to the frame 6 and the cartridge holder 3 may move alone, e.g., the cartridge holder 3 could pivot from an upper position to a lower position in which the opening 3a is opposed to the fixed cover 4. Thereafter, the holder 3 could move radially or linearly so that the cover 4 at least partially covers the opening 3a.

In another aspect of the invention, a cartridge retainer may be arranged to hold a cartridge in the cartridge holder opening in at least a part of movement of the cartridge holder from the open to the closed position. For example, in an embodiment in which a cartridge holder is arranged to move between an open position, in which an opening of the cartridge holder is oriented in an upwardly inclined position to receive a cartridge, and a closed position, in which the opening is oriented in a horizontal or downwardly inclined position, there may be some chance that the cartridge may fall from the opening. A cartridge retainer may include an engagement portion, such as one or more fingers that engage with the top surface of the cartridge, that helps keep the cartridge in place in the cartridge holder opening. By having a cartridge retainer engage with a top surface of the cartridge to help keep the cartridge in place, a user may be permitted to place the cartridge in a somewhat loose fitting opening of the cartridge holder without concern that the cartridge will fall from the opening when the cartridge holder is moved. That is, while a cartridge could in some embodiments be held in place in the cartridge holder by a friction fit or other similar arrangement, such engagement between the cartridge and cartridge holder may make the cartridge difficult to place in, or remove from, the cartridge holder. This may impede, for example, the operation of manual or automatic ejection or other removal of the cartridge after use. In contrast, a cartridge retainer that does not rely on a frictional engagement of the cartridge with the cartridge holder may make cartridge placement/removal easier, yet still help ensure that a cartridge is properly associated with a holder, e.g., as the cartridge holder is moved between open and closed positions.

As can be seen, for example, in FIGS. 4-6, the system 100 may include a cartridge retainer 8 that is positioned adjacent the cartridge holder opening 3a in a portion of the cartridge holder 3 movement between the open and closed positions. In this embodiment, the cartridge retainer 8 includes an engagement portion that is positioned adjacent the opening 3a at about the time the holder 3 reaches an intermediate position shown in FIG. 6, or somewhat before reaching the intermediate position. Thus, as the cartridge holder approaches or reaches an approximately horizontal position (such that the axis 101 is approximately horizontal) or other position, the cartridge retainer 8 may be positioned to restrain movement of the cartridge 1 from the opening 3a. In this embodiment, the cartridge retainer 8 is mounted to the carrier 41 for sliding movement relative to the cover 4 and the cartridge holder 3. As a result, the cartridge retainer 8 is positioned away from the cartridge holder 3 when the cartridge holder 3 is in the open position. This may make placement of a cartridge in the holder 3, or removal of a cartridge, easier. While other suitable arrangements may be employed, in this embodiment, the cartridge retainer 8 includes an engagement portion 81 arranged to move in a slot or other groove of the carrier 4 and a resilient element 82 (such as a spring, rubber band, or other component) that biases the engagement portion 81 to move away from the cover 4. Other possible arrangements include having the cartridge retainer 8 mounted to the cover 4, having the cartridge retainer mounted to the frame 6, and others. In another embodiment, a cartridge retainer 8 could include an arm mounted to the cartridge holder 3 and arranged to pivot away from the opening 3a with the holder 3 in the open position, and pivot toward the opening 3a as the holder is moved toward the closed position. Such pivotal motion could be driven by a spring in one direction and by contact with a portion of the frame 6 in the other direction, e.g., as the holder 3 is moved relative to the frame 6.

Figure 8:
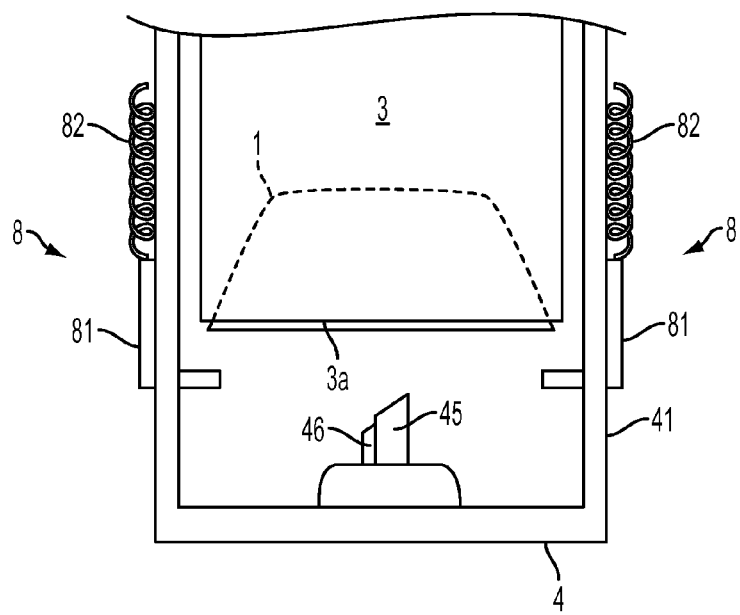
FIG. 8 is a partial top view of the arrangement of FIG. 6.

FIG. 8 shows a top view of the carrier 41, cartridge holder 3 and cover 4 in the intermediate position shown in FIG. 6. This view illustrates how fingers of the engagement portions 81 are positioned adjacent the opening 3a, e.g., between the opening 3a and the cover 4, to help restrain movement of the cartridge 1 from the holder 3. As the cartridge holder 3 is further moved toward the closed position (see FIG. 7), the cover 4 and engagement portions 81 will move toward the cartridge holder 3 by the links 44 sliding the carrier 41 rearwardly. At some point, the engagement portions 81 will contact the top surface of the cartridge 1 prior to the cartridge holder 3 reaching the closed position and the cover 4 being positioned over the opening 3a. This may help the engagement portions 81 to hold the cartridge 1 in place in the holder 3, and in fact, as the carrier 41 is further slid rearwardly, the resilient elements 82 may provide a force on the engagement portions 81 that resiliently clamps the cartridge 1 in place until the cartridge holder 3 reaches the closed position and the cover 4 is pressed against the top surface of the cartridge.

Of course, since the cartridge retainer 8 in this embodiment is mounted to the carrier 41, the cartridge retainer 8 is arranged to move with the cartridge holder 3 in at least a portion of its movement between the open and closed positions. This movement with the cartridge holder 3 may help the cartridge retainer 8 better operate to help keep a cartridge 1 in place. For example, the cartridge retain 8 may be arranged to move with the cartridge holder 3 in portions of movement in which a cartridge might be most likely to fall from the holder 3, such as when an axis 101 of the opening 3a approaches or falls below the horizontal. However, since the retainer 8 only moves with the holder 3 in a portion of its movement, the retainer 8 may be positioned away from the holder 3 (or at least away from the opening 3a, like the cover 4) to allow access to the opening 3a. Other arrangements, such as the retainer 8 including an arm mounted to the holder 3 discussed above, may involve the retainer 8 moving with the holder 3 at all times, yet only have the retainer 8 function to help restrain a cartridge in the holder 3 in a portion of the holder's movement.

The cartridge retainer 8 may also provide a feature of disengaging the cartridge 1 from the cover 4 (as necessary) when the cartridge holder is moved from the closed position toward the open position. For example, in an embodiment in which the cover 4 includes inlet and/or outlet piercing elements 45, 46 or other inlet/outlet probes, a cartridge 1 may stick to an element 45, 46 or otherwise tend to remain engaged with the cover 4. However, a cartridge retainer 8 may urge the cartridge 1 to move away from the cover 4, pulling the cartridge 1 from a piercing element 45, 46 or otherwise helping to keep the cartridge engaged with the opening 3a of the cartridge holder 3. The retainer 8 may exert a bias to the cartridge 1, e.g., under the force of the resilient element 82, to help disengage the cartridge and keep the cartridge 1 in the opening 3a of the holder 3. Of course, as the cartridge holder 3 is moved through the intermediate position and toward the open position, the cartridge holder 3 will move away from the cartridge retainer 8 and the cover 4. However, the risk of the cartridge 1 falling from the holder 3 may be reduced, e.g., because the opening 3a of the holder 3 may be upwardly inclined.

One aspect of the invention included in this illustrative embodiment is that cartridge retainer may be mounted for movement with the cover relative to the cartridge holder. That is, although the cartridge retainer may be arranged to help keep the cartridge in place with respect to the cartridge holder, the retainer may actually be arranged for movement with the cover. This feature may help ensure that the cartridge retainer is positioned away from the cartridge holder when in the open position so that the retainer does not interfere with placement of a cartridge in the holder, or removal of a cartridge from the holder.

In another aspect of the invention, the cartridge retainer may have an engagement portion positioned between the cartridge holder and the cover with the cartridge holder in the closed position. This arrangement may allow for a simpler cartridge retainer arrangement, e.g., fingers or other elements that contact the cartridge top surface need not be retracted or otherwise removed from a space between the cartridge holder and the cover. While in this embodiment the part of the fingers of the engagement portions 81 positioned between the cartridge holder 3 and the cover 4 do not interfere with the formation of a suitable seal (either between the cartridge and the cartridge holder or between the cartridge and the cover, if a cartridge is present, and/or between the cartridge holder and the cover if a cartridge is not present), accommodation may be made to help ensure a proper seal is formed, such as by having part of the engagement portions received into grooves or other features of the cover and/or by arranging the cartridge to deform to accommodate the engagement portions.

Another aspect of the invention included in the embodiment discussed above is that the cartridge holder, a wall element and the cover may operate together to form a chamber in which a cartridge may be enclosed. For example, a wall member may be mounted to the frame (whether fixed or movable) and define a first portion of a chamber, the cartridge holder may define a second portion of the chamber, and the cover may define a third portion of the chamber. As discussed above, the cartridge holder and cover may be made movable relative to the frame, and to each other, but when the cartridge holder is in the closed position and the cover is covering the opening of the cartridge holder, the cartridge holder, the wall member and the cover may define the chamber in a closed state in which a cartridge held by the cartridge holder is enclosed. Having a chamber in which a cartridge can be enclosed formed by three separable parts may provide advantages such as allowing for automated cartridge ejection, easier cleaning of the cartridge holder or other parts of the chamber, and/or easier manufacture of the system. For example, the cartridge holder may define a top wall, side walls, and a rear wall of the chamber, whereas the wall member defines a bottom wall of the chamber, and the cover defines a front wall of the chamber. Thus, the cartridge holder may have a fully open side (the bottom), allowing for easier access to the cartridge holder interior for cleaning, allowing for a cartridge to be released from the holder to fall through the open bottom (e.g., for automated ejection), and/or allowing the cartridge holder to be molded as a single part without requiring overly complicated or expensive tooling. Also, by defining a closed chamber even without the presence of a cartridge in the holder, the chamber can be cleaned by introducing liquid into the chamber with the cartridge holder in the closed position, e.g., by injecting hot water into one or both of the piercing elements 45, 46.

Figure 9:
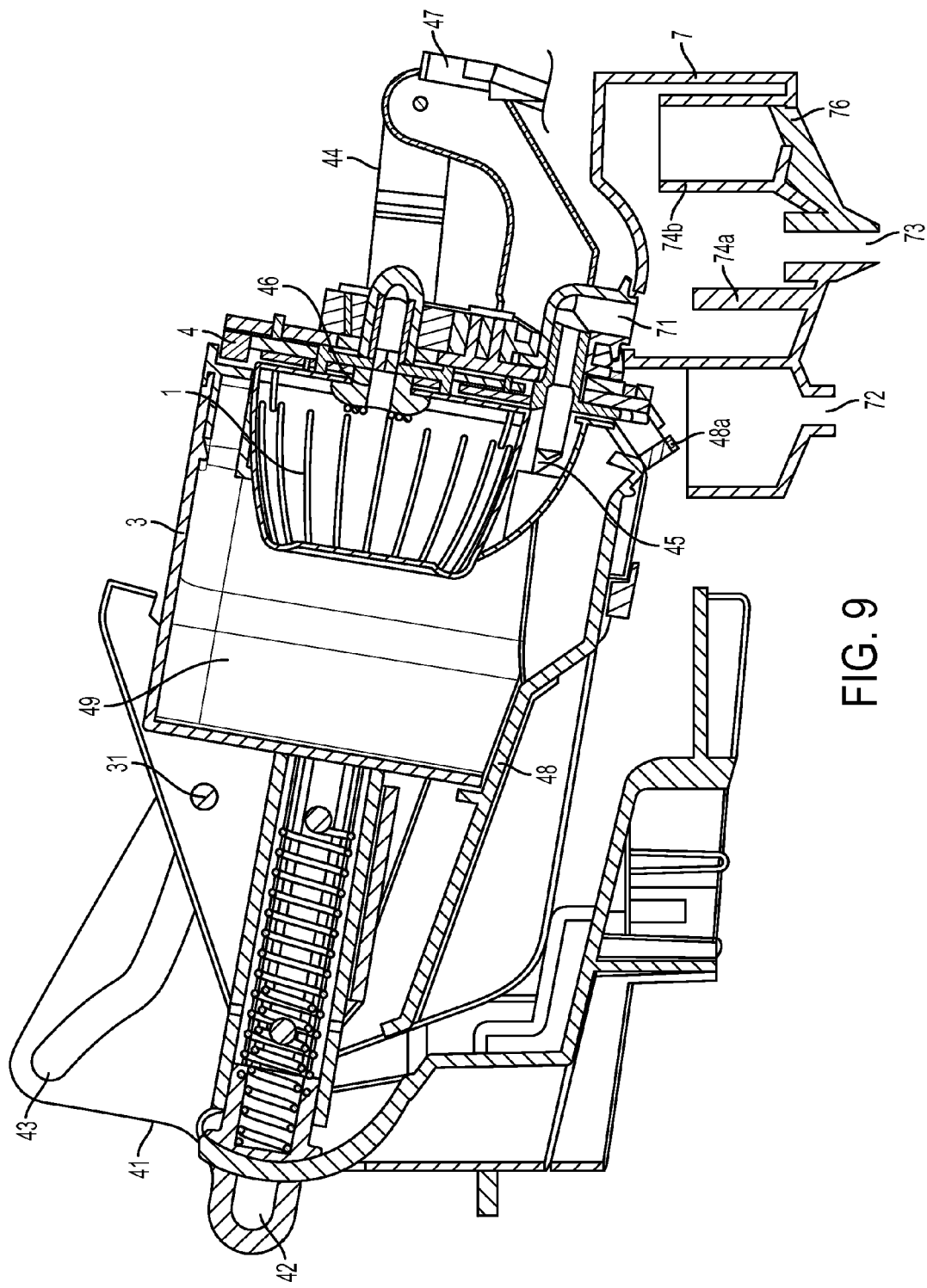
FIG. 9 is a cross-sectional view of the arrangement of FIG. 7.

FIG. 9 shows a cross sectional view of the cartridge holder 3, carrier 42 (and cover 4) and base 47 with the cartridge holder 3 in the closed position. In this state, the cartridge holder 3 is positioned to contact a wall member 48 of the base 47, which forms a bottom wall of the beverage forming chamber 49. Also, the cover 4 is positioned to cover the opening 3a of the cartridge holder 3, and thus the chamber 49 is enclosed. In some embodiments, the chamber 49 may be substantially water-tight such that any liquid introduced into the chamber (such as through the piercing elements 45, 46 or a leaking cartridge 1) will not exit the chamber 49, or will exit the chamber 49 only through a defined outlet 48a. In this embodiment, the wall member 48 is arranged so that, in the closed position, any liquid on the wall member 48 drains forwardly to the outlet 48a, which is formed as a channel or trough in the wall member 48. The outlet 48a may direct liquid to an outlet chamber 7 that is also arranged to receive beverage from the outlet piercing element 45 and associated conduit (which together may form an outlet arranged to interface with a cartridge to receive beverage from the cartridge). While in this embodiment, a piercing element 45 is shown to be included with a beverage outlet, the outlet need not pierce a cartridge, but rather may be arranged to receive beverage, e.g., via a non-piercing port or other arrangement. For example, the outlet may include an opening in the cover 4 that is arranged to receive beverage from an opening or other port in a cartridge. Alternately, beverage may exit the cartridge and pass into the chamber 49 for exit via the outlet 48a.

While in this illustrative embodiment, a chamber is formed by three separable portions that are all moveable relative to the frame and to each other, alternate arrangements are possible. For example, the wall member could be fixed to the frame and arranged to mate with the cartridge holder when the holder is moved to the closed position. Similarly, the cartridge holder could be made fixed to the frame and the cover and wall member may move relative to the holder to form the chamber, or the cover could be made stationary relative to the frame and the wall member and holder movable.

In another aspect of the invention, an outlet that interfaces with a cartridge or a beverage formation chamber to receive beverage may be arranged to be fluidly coupled to an outlet chamber only when the cartridge holder is in a closed position. This arrangement may allow an outlet to be associated with a movable cover or other portion of a cartridge chamber, yet eliminate any need for flexible conduits or other connections between the outlet and an outlet chamber or other arrangement that delivers beverage to a user's cup or other container. Instead, a fluid connection between the outlet on the cover or other part may be broken when the cartridge chamber is opened and reconnected when the cartridge chamber is closed, i.e., when the system is ready to make a beverage.

In this illustrative embodiment shown in FIG. 9, the outlet piercing element 45 includes a conduit that extends downwardly from the cover 4 and is arranged to mate with an inlet opening 71 of an outlet chamber 7 when the cartridge holder 3 is in a closed position. The conduit may be arranged to form a suitable seal with the inlet opening 71, e.g., by having a portion of the conduit pass into the inlet opening 71, and a flange or other seal element on the conduit engage with the outlet chamber 7 housing. The conduit itself may be made of a resilient material, such as a silicone rubber, to help form a suitable seal with the inlet opening 71 and/or accommodate minor misalignment or movement between the conduit and the inlet opening 71. Of course, other arrangements are possible, and the conduit need not form a seal with the inlet opening 71, but rather may simply discharge beverage into the opening 71. As described above, opening of the cartridge holder 3 causes the cover 4 to move upwardly relative to the outlet chamber 7, and thus move the outlet piercing element 45 and its conduit upwardly away from the inlet opening 71. As a result, the conduit will only be arranged for fluid communication with the inlet opening 71 with the cover 4 and/or cartridge holder 3 in the closed position and ready to form a beverage.

As discussed above, an outlet for beverage formed in the chamber 49 need not pass through a piercing element 45 and associated conduit. For example, beverage may simply drain from the cartridge 1 into the chamber 49 and to the wall member 48. As can also be seen in FIG. 9, beverage or other liquid in the chamber 49 may drain to the outlet 48a of the wall member 48, which directs the liquid to a drain opening 72 of the outlet chamber 7. While in this embodiment the drain opening 72 is separate from the outlet opening 73 through which beverage from the piercing element 45 exits the outlet chamber 7, the two openings 72, 73 could be combined into one, if desired.

Figure 10:
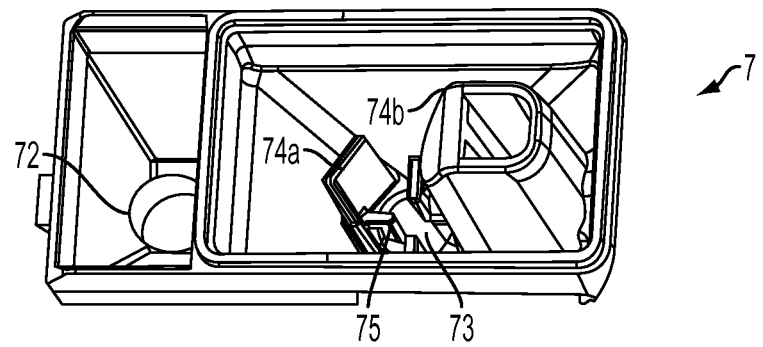
FIG. 10 is a perspective view of an outlet chamber in an embodiment in accordance with the invention.
Figure 11:
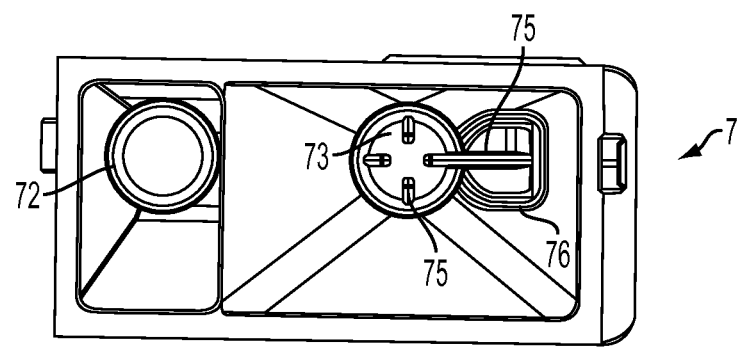
FIG. 11 is a bottom view of the outlet chamber of FIG. 10.

In another aspect of the invention, an outlet chamber that outputs beverage to a user's cup or other container may be arranged to control bubble size, bubble volume, a bubble to liquid ratio, beverage flow rate or other velocity, and/or other characteristics of a beverage foam that may be created when making a beverage. That is, in the formation of some beverages, foam or other bubbles may be created. The way in which foam is created may vary, such as by introducing air, steam, liquid and/or combinations of such materials into the cartridge 1, whipping a beverage using a mechanical whipping element to introduce air bubbles, passing the beverage through a venturi structure configured to inject air into the flowing beverage stream, etc., and in some cases it may be desirable to control an amount of foam for beverage liquid produced, the maximum size of bubbles created, and other characteristics of the foam. The inventors have appreciated that characteristics of a foam produced may be conditioned by use of a suitably configured chamber through which beverage and/or foam passes to a user's cup. In one illustrative embodiment further illustrated in FIGS. 10 and 11, a standpipe 74 fluidly arranged between the inlet opening 71 and the outlet opening 73 of an outlet chamber 7 may help control characteristics of foam. Moreover, aspects of the invention incorporated into the outlet chamber 7 provide for foam conditioning regardless of the volume of beverage created and passed through the outlet chamber 7. (Note that the top perspective view of FIG. 10 does not include an upper portion of the outlet chamber 7 that defines the inlet opening 71. This upper portion has been removed for clarity, but it should be understood that the outlet chamber 7 defines a generally enclosed space between the inlet opening 71 and the outlet opening 73/secondary outlet opening 76.) The standpipe 74 may extend upwardly from the bottom of the outlet chamber 7, and may partially surround the outlet opening 73 and/or the secondary outlet opening 76. For example, one portion 74a of the standpipe 74 may be positioned between the inlet opening 71 and the outlet opening 73, and another portion 74b may be positioned between the outlet opening 73 and a secondary outlet opening 76. The first portion 74a of the standpipe 74 may function to block a direct pathway from the inlet opening 71 to the outlet opening 73, and thus delay the exit of bubbles from the chamber 7. This time delay may reduce the size of bubbles in the beverage, e.g., since larger bubbles may tend to burst in less time than smaller bubbles, or have other desired effects of conditioning bubble size. Also, the standpipe 74 may force bubbles to pass through a relatively narrow space between the first and second portions 74a, 74b to the outlet opening 73, causing larger bubbles to burst or be prevented from exiting. In one embodiment, the first portion 74a of the standpipe 74 between the inlet opening 71 and outlet opening 73 is formed by two, flat vertical walls that extend upwardly from the chamber 7 bottom and are joined together at an angle to each other.

The second portion 74b of the standpipe 74 may be separate from the first portion 74a and may include a wall element that extends upwardly from the chamber 7 bottom and completely surrounds the secondary outlet opening 76 so that liquid and/or foam that exits the opening 76 is required to pass over the wall element. By helping to resist the passage of liquid to the secondary opening 76, the second portion 74b may help discharge foam from the outlet chamber 7. For example, since foam tends to be lighter than liquid and the outlet opening 73 is positioned at a bottom of the chamber 7, liquid will tend to exit the chamber 7 before any foam, leaving the foam behind to accumulate. However, since the secondary opening 76 is positioned above the opening 73 and the passage of liquid to the secondary opening 76 is resisted (e.g., by the second portion 74b of the standpipe), foam may exit through the secondary opening 76 simultaneous with liquid exiting the opening 73. This may help ensure that foam, being lighter than liquid beverage, is not trapped in the outlet chamber 7, but instead has an exit via the secondary opening 76. Foam may not compete with much liquid beverage for exit at the secondary opening 76 because the wall of the second portion 74b prevents liquid from moving to the secondary opening 76 without passing over the wall. In addition, the secondary outlet opening 76 may provide a beverage exit passageway if the outlet opening 73 becomes clogged, whether by particulate matter, a foam mass, or other. One or more ribs 75 may extend from the secondary opening 76 downwardly to the outlet opening 73, thereby directing fluid flow from the opening 76 to the outlet opening 73. In this way, foam, liquid or other material exiting the secondary opening 76 may be merged with material exiting the outlet opening 73. Other arrangements for aiding foam exit and conditioning are possible, such as having a secondary opening 76 formed in a sidewall of the chamber 7. This arrangement may allow for the preferential exit of foam while eliminating any need for a wall portion as in the illustrated embodiment. Also, or in addition, the arrangement of the standpipe portions and/or other aspects of the outlet chamber may help to reduce a velocity of the beverage at the inlet opening before the beverage exits the outlet chamber. That is, a velocity of the beverage at the outlet opening 73 and secondary opening 76 may be lower than a velocity of the beverage entering the inlet opening 71. This may help reduce spraying and/or splashing of the beverage when exiting the outlet chamber and transiting to the user's cup 2 or other location. The outlet chamber may function as a kind of reservoir or capacitor that reduces flow surges or other variations in beverage flow from the outlet chamber, and has an overall effect of reducing beverage flow rate.

Another feature of the outlet chamber 7 (shown in FIG. 11) is that the outlet opening 73 includes one or more ribs 75 that extend vertically through and below the opening 73. These ribs 75 may help direct the flow of liquid in a desired direction, e.g., downwardly in an approximately vertical direction (or other single direction) so as to help reduce splashing. The ribs 75 may also help to direct the formation of any bubbles at the opening 73, e.g., to help reduce the likelihood of bubble formation, and if any bubbles do form, to help limit their size and/or the area in which the bubbles form. Thus, for example, the ribs 75 may puncture larger bubbles and/or help direct bubble formation (if any) to remain localized around the outlet opening 73.

In one embodiment, the outlet chamber 7 may be made removable from the system 100, e.g., for replacement, cleaning, and/or exchange with a different outlet chamber 7. For example, an outlet chamber 7 may be designed specifically for the discharge of certain beverages, such as hot chocolate, and the suitable foam conditioning required for those beverages, whereas another outlet chamber 7 may be designed for other beverages, such as tea, and the suitable foam conditioning (e.g., foam removal) from such beverages. By exchanging outlet chambers 7, a user may configure the system 100 for the creation of beverages having desired characteristics.

Figure 12:
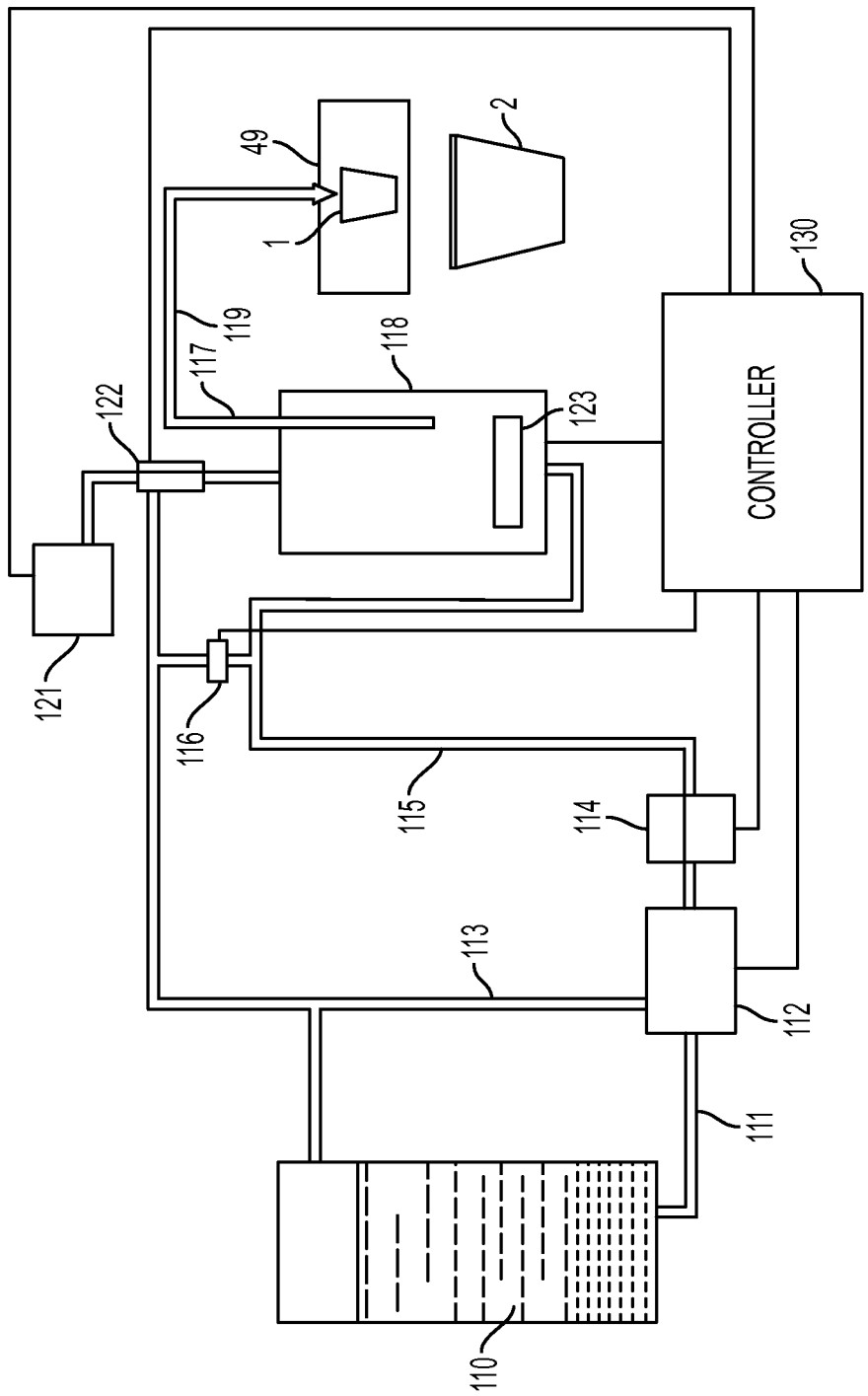
FIG. 12 is a schematic diagram of components of a beverage forming system in an illustrative embodiment.

FIG. 12 shows a schematic block diagram of various components that may be included in a beverage forming apparatus 100 in one illustrative embodiment. Those of skill in the art will appreciate that a beverage forming apparatus 100 may be configured in a variety of different ways, and thus aspects of the invention should not be narrowly interpreted as relating only to one type of beverage forming apparatus. Water or other liquid from a storage tank 110 may be provided via a supply conduit 111 to a pump 112 (such as a centrifugal pump, piston pump, solenoid pump, diaphragm pump, etc.), which pumps the liquid via a pump conduit 115 to a heating tank or chamber 118. Operation of the water pump 112 and other components of the apparatus 100 may be controlled by a controller 130, e.g., including a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions. The heating tank 118 may be filled with a desired amount of liquid by any suitable technique, such as running the pump 112 for a predetermined time, sensing a water level in the heating tank 118 using a conductive probe sensor or capacitive sensor, detecting a pressure rise in heating tank 118 when the liquid fills the tank, or using any other viable technique. For example, the controller 130 may detect that the heating tank 118 is completely filled when a pressure sensor detects a rise in pressure indicating that the water has reached the top of the heating tank 118. Alternately, the controller 130 may not detect whether the tank 118 is filled or not, and simply assume that the tank 118 is filled once a first fill operation is completed.

Water in the tank may be heated, if desired, by way of a heating element 123 whose operation is controlled by the controller 130 using input from a temperature sensor or other suitable input. Water in the heating tank 118 may be dispensed via a heating tank conduit 119 to a cartridge chamber 49 or other beverage forming station. Although in this embodiment the conduit 119 is shown extending below the top of the tank 118, the conduit 119 may be arranged in any suitable way, such as connected simply to the top of the tank 119 without extending into the tank at all. The cartridge chamber 49 may include any beverage making ingredient, such as ground coffee, tea, a flavored drink mix, or other substance, e.g., contained in a cartridge 1. Liquid may be discharged from the heating tank 118 by pressurizing the metering tank with air provided by an air pump 121 that causes the liquid to be discharged out of a tube 117 and into the heating tank conduit 119. Completion of the dispensing from the heating tank 118 may be detected in any suitable way, such as by detecting a pressure drop in the heating tank 118, by detecting a water level change in the heating tank 118, use of a flow meter, or using any other viable techniques. Liquid may alternately be discharged from the heating tank 118 by the pump 112 operating to force additional liquid into the tank 118, thereby displacing water out of the tank 118 and to the brew chamber. A flow sensor or other suitable device may be used to determine the amount of liquid delivered to the tank 118, and thus the amount of liquid delivered to the brew chamber. Alternately, the pump 12 may be a piston-type, diaphragm-type or other pump arranged such that a known volume of liquid may be delivered from the pump 112 to the tank 118, thus causing the same known volume to be delivered to the cartridge chamber 49. Thus, a specified volume of liquid may be delivered to the cartridge chamber 49 by operating the pump 112 to deliver the specified volume of liquid to the tank 118. Liquid may be introduced into the cartridge 1 at any suitable pressure, e.g., 1-2 psi or higher. Once liquid delivery by the pump 112 is complete, an air pump 121 may be operated to force air into the top of the tank 118 and/or into the conduit 119 to clear the conduit 119 and cartridge 1 of liquid, at least to some extent.

While in this illustrative embodiment, a liquid supply system arranged to provide liquid to a beverage forming chamber (the cartridge chamber 49) may include a heating tank 118, pump 112, storage tank 110 and other components, these components are not necessarily required. Instead, any suitable arrangement for providing liquid to a chamber may be employed, whether using gravity, a pump, air pressure or other motive force to move liquid. Also, it is not necessarily required that liquid be heated prior to being provided for mixing with a beverage medium. Instead, liquid may be provided for forming a beverage at any suitable temperature.

Once a cartridge is located in the cartridge chamber 49 in the closed position, the beverage forming system 100 may use the cartridge 1 to form a beverage. For example, one or more inlet needles 46 associated with the cover 4 may pierce the cartridge 1 so as to inject heated water or other liquid into the cartridge 1. The injected liquid may form the desired beverage or a beverage precursor. As is known in the art, the cartridge 1 may take any suitable form such as those commonly known as a sachet, pod, capsule, container or other. For example, the cartridge 1 may include an impermeable outer covering within which is housed a beverage medium, such as roasted and ground coffee or other. The cartridge 1 may also include a filter so that a beverage formed by interaction of the liquid with the beverage medium passes through the filter before being dispensed into a container 2. As will be understood by those of skill in the art, cartridges in the form of a pod (e.g., having opposed layers of permeable filter paper encapsulating a beverage medium) may use the outer portion of the cartridge 1 to filter the beverage formed. The cover 4 may also include one or more outlet needles 45 or other elements to puncture or pierce the cartridge 1 at an outlet side to permit the formed beverage to exit the cartridge 1. Other arrangements for a beverage outlet are possible however, e.g., the cartridge may have a permeable portion that allows beverage to enter the chamber 49 and subsequently exit via the outlet channel 48a to the outlet chamber 7, and others. Also, there is no requirement that an inlet and/or an outlet pierce a cartridge to provide liquid to, or receive beverage from, a cartridge. Instead, communication with a cartridge may be performed using any suitable ports or other features.

Although in the embodiments above the cartridge holder and other movable portions are driven by hand, other arrangements are envisioned for various aspects of the invention. For example, a motorized actuator may be used to move the cartridge holder, rather than a manually-operated handle. A motorized actuator may cause relative motion of components in response to a push-button operation, completion of a beverage formation cycle, or other input or condition. Also, to the extent different movable components are linked together in some fashion, such linkages are not limited to engagement via a cam and cam follower or other configurations discussed above. Other arrangements are possible, such as a pair of gears or a rack and pinion engagement (including straight or curved rack configurations).

Figure 13:
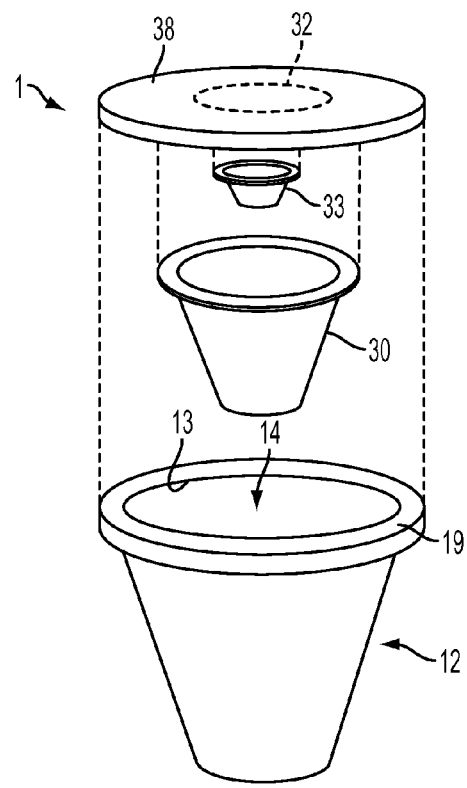
FIG. 13 shows an exploded view of an illustrative beverage cartridge.
Figure 14:
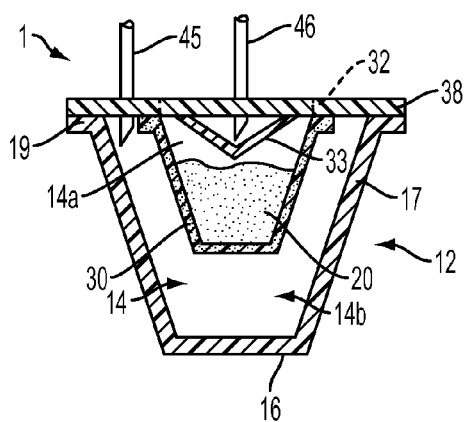
FIG. 14 is a cross-sectional view of the cartridge of FIG. 13.

FIGS. 13 and 14 show an exploded view and cross-sectional side view of a cartridge 1 that may be used in the embodiments discussed above. While aspects of the invention may be used with any suitable cartridge, or no cartridge at all, the illustrative embodiment shown may provide features that enhance the operation of a beverage forming system 100. The cartridge 1 in this example may be used in a beverage machine to form any suitable beverage such as tea, coffee, other infusion-type beverages, beverages formed from a liquid or powdered concentrate, etc. Thus, the cartridge 1 may contain any suitable beverage medium 20, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriceuticals, etc.), and/or other beverage-making material (such as powdered milk or other creamers, sweeteners, thickeners, flavorings, and so on). In one illustrative embodiment, the cartridge 1 contains a beverage medium 20 that is configured for use with a machine that forms coffee and/or tea beverages, however, aspects of the invention are not limited in this respect.

In this illustrative embodiment, the cartridge 1 includes a container 12 that includes an interior space 14 having a first chamber 14a and a second chamber 14b that are separated by a filter 30. It should be understood, however, that other additional chambers in the interior space and/or sub-portions or areas of the first and second chambers, may be provided in other embodiments. For example, it is possible for the cartridge to have three spaces that separated by two filters (e.g., a first filter separates two portions of a first chamber and a second filter separates the first and second chambers), and so on. In another embodiment, the first or second chamber may be separated into two portions by a venturi or other feature that introduces air into a beverage. Thus, the first and/or second chambers may be divided or otherwise separated into two or more portions or areas by filters, walls, dividers, passageways, and other features.

In this embodiment, the container 12 may have a frustoconical cup shape with a sidewall 17 and an opening 13. However, in other embodiments, the container 12 may have a fluted, conical, or cylindrical shape, may be in the form of a square or rectangular cup, a domed cup, a sphere or partial sphere, or other suitable form, may have a fluted, corrugated, or otherwise shaped sidewall, and so on. Also, the container 12 need not necessarily have a defined shape, as is the case with some beverage sachets and pods. For example, although the container 12 in this embodiment has a relatively rigid and/or resilient construction so that the container 12 tends to maintain its shape, the container 12 could be made to have a more compliant and/or deformable arrangement, e.g., like a sachet container made from a sheet of deformable material. Thus, an interior space defined by the container 12 may be formed only after the container material is formed around a beverage medium, filter and/or other cartridge components, similar to when two filter paper layers (container material) are joined together around a charge of coffee grounds to form a pod or other form of cartridge.

If the container 12 includes an opening 13, the opening 13 may be closed by a lid 38, e.g., a foil and polymer laminate material that is attached to a rim 19 of the container 12. (Although in this embodiment the rim 19 is arranged as an annular flange-like element, the rim 19 may be arranged in other ways. For example, the rim 19 may be the top edge of the sidewall 17 without any flange element.) The container 12 and/or the lid 38 may provide a barrier to moisture and/or gases, such as oxygen. For example, the container 12 may be made of a polymer laminate, e.g., formed from a sheet including a layer of polystyrene or polypropylene and a layer of EVOH and/or other barrier material, such as a metallic foil. Such an arrangement may provide suitable protection for the beverage medium 20, e.g., from unwanted exposure from moisture, oxygen and/or other materials. It should be understood, however, that the container 12 and/or the lid 38 may be made of other materials or combinations of materials, such as biopolymers, compostable polymers, paper, foils, etc.

The filter 30 may be attached to the lid 38 at a periphery 32 that is spaced inwardly and away from the rim 19. In addition, the filter 30 may extend from the periphery 32 at least partially into the interior space 14. As mentioned above, the filter 30 may be arranged between the first and second chambers 14a and 14b of the interior space 14 so that liquid in the first chamber 14a of the interior space (e.g., that interacts with beverage medium 20) flows through the filter 30 and toward the second chamber 14b of the interior space 14 before exiting the container 12. The filter 30 may function to remove materials over a certain size from a liquid, e.g., may remove coffee grounds from liquid in the first chamber 14a, allowing a coffee beverage to pass through the filter 30 to the second chamber 14b. For example, the filter may include a piece of filter paper that is arranged to allow a liquid and dissolved and/or suspended materials of a certain size to pass, yet prevent relatively large particles from flowing through the filter. Of course, the filter 30 may have multiple stages, e.g., a coarse filter portion that filters out relatively large particles, followed by a fine filter portion that filters relatively smaller particles, and so on. In addition, the filter 30 may include one or more portions that function to filter liquid passing through the filter 30, as well as portions that are impermeable or otherwise restrict flow. Thus, the filter 30 may include two or more separate components, if desired. For example, the filter 30 may include a rigid, impermeable plastic sleeve that is attached to the lid 38 at the periphery 32. At a location away from the lid 38, a porous filter paper may be attached to the sleeve. Thus, not all portions of the filter need be permeable to liquids. The filter 30 may also have areas with different permeability, e.g., to help direct flow toward one or more areas of the filter 30. For example, regions of the filter 30 near the lid 38 in FIG. 1 may have a relatively lower permeability as compared to regions further away from the lid 38. This may help encourage flow through the beverage medium 20 toward lower regions of the filter 30, potentially improving the dissolution of materials in the medium 20 into the liquid.

The filter 30 may also, or alternately, function to help prevent the movement of materials from the second chamber 14b to the first chamber 14a. For example, the cartridge 1 may include a beverage medium 20 in the second chamber 14b and no beverage medium 20 in the first chamber 14a. In this case, the filter 30 may help prevent contact of the beverage medium 20 with a needle or other liquid inlet that pierces the lid 38 to introduce water or other liquid into the cartridge 1. For example, some beverage media 20, such as powdered drink mixes, can clog or otherwise foul an inlet needle if allowed to contact the needle. The filter 30 may help prevent such contact, helping to maintain proper operation of the cartridge and preparation of a beverage.

In some embodiments, the filter 30 may be the only element in the interior space 14 that separates the first and second chambers 14a and 14b (as in the FIGS. 1-3 embodiment). In other arrangements, other components, such as walls, ribs, or other structures in addition to the filter 30, may physically separate two or more portions of the interior space 14 from each other. However, regardless of the manner in which the filter is arranged, a permeable portion of the filter 30 may be the only component that separates or divides two or more portions of the interior space 14 in a flow-wise sense, e.g., liquid may need to flow through the permeable portion of the filter 30 to pass from the first chamber 14a to the second chamber 14b.

In this illustrative embodiment, the filter 30 may have a substantially frustoconical shape with fluted or pleated sidewalls and a generally flat bottom, as shown. However, the filter 30 may have any suitable shape, such as a cylindrical shape, a square cup shape, a domed shape, a flat sheet, or other. The filter 30 may be the attached to the lid 38 in any suitable way, such as by an adhesive, thermal welding, ultrasonic welding, chemical bonding, crimping or other mechanical bonding, etc. As will be understood, the shape of the periphery 32 may depend on the shape of the filter, at least at an upper end of the filter 30. In this embodiment, the periphery 32 has a circular shape, but oval, rectangular, triangular, irregular and other shapes are possible. In this illustrative embodiment, the filter 30 may include a permeable filter paper made of a combination of polypropylene and cellulose materials and may be attached to the lid 38 at an upper portion of the filter 30 by thermal welding. As can be seen in FIGS. 1-3, the upper portion of the filter 30 that is attached to the lid 38 may have an annular, or washer-like shape that extends radially outwardly as shown from the periphery 32 (or inwardly in other embodiments), but such radial extension is not required. In some embodiments, the portion of the filter attached to the lid 38 may extend radially outwardly from the periphery to, and over, the rim 19 such that part of the filter 30 is sandwiched between the lid 38 and the rim 19.

When using the cartridge 1 to form a beverage, the lid 38 and/or the container 12 may be pierced to introduce liquid into the cartridge and receive beverage from the cartridge. (As used herein, "beverage" refers to a liquid substance intended for drinking that is formed when a liquid interacts with a beverage medium. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.) To introduce liquid into the cartridge, for example, as shown in FIG. 14, a portion of the lid 38 generally circumscribed by the periphery 32 may be pierced by an inlet piercing element 46 (e.g., a needle) so that water or other liquid may be injected into the cartridge 1. Other inlet piercing arrangements are possible, such as multiple needles, a shower head, a non-hollow needle, a cone, a pyramid, a knife, a blade, etc. A beverage machine that uses the cartridge may include multiple piercing elements of the same type or of different types, as the invention is not limited in this respect. In another arrangement, a beverage machine may include a piercing element (such as a spike) that forms an opening and thereafter a second inlet element (such as a tube) may pass through the formed hole to introduce liquid into (or conduct liquid out of) the container. In other embodiments, the lid 38 may be pierced, or otherwise effectively opened for flow, by introducing pressure at an exterior of the lid 38. For example, a water inlet may be pressed and sealed to the lid 38 exterior and water pressure introduced at the site. The water pressure may cause the lid 38 to be pierced or otherwise opened to allow flow into the cartridge 1. In another arrangement, the lid 38 may include a valve, conduit or other structure that opens when exposed to a suitable pressure and/or when mated with a water inlet tube or other structure.

The cartridge 1 may also be penetrated by an outlet piercing element 45 (e.g., a needle) at a second portion of the lid 38 outside of the periphery 32 and apart from the inlet opening. As with the inlet piercing arrangement, the outlet piercing arrangement may be varied in any suitable way. Thus, the outlet piercing element 45 may include one or more hollow or solid needles, knives, blades, tubes, and so on. Alternately, the cartridge 1 may include a valve, septum or other element that opens to permit beverage to exit when liquid is introduced into the cartridge, but otherwise remains closed (e.g., to protect the beverage medium from external conditions such as oxygen, moisture or others). In such a case, no piercing element for forming the outlet opening is necessarily required although may be used, e.g., to allow the valve or other element to open. Also, in this illustrative embodiment the piercing element 45 remains in place to receive beverage as it exits the opening formed in the container 12 or lid 38. However, in other embodiments, the piercing element 45 may withdraw after forming an opening, allowing beverage to exit the opening and be received without the piercing element 45 being extended into the cartridge 1.

The cartridge 1 may include an element that helps to distribute liquid that is introduced into the cartridge to the beverage medium and/or that helps resist contact of a fluid inlet with the beverage medium. In the illustrative embodiment shown in FIGS. 13-14, the cartridge includes a flow distributor 33 that is positioned between the inlet 46 and the beverage medium 20. In this embodiment, the flow distributor 33 functions to help incoming water or other liquid more evenly wet the beverage medium 20 as well as help resist contact of the inlet 46 with the beverage medium. Of course, the performance of both functions is not required, e.g., the flow distributor 33 may influence the flow of liquid into the cartridge, but not resist contact of beverage media with the inlet. More even wetting of the beverage medium 20 or other flow control can help the cartridge produce a desired beverage, e.g., by more completely dissolving materials in the beverage medium 20, by improving extraction of soluble and insoluble substances from the beverage medium 20, by improving flow of beverage through the filter, and so on. Reducing contact of the beverage medium 20 with the inlet 46 can help reduce the likelihood of clogging of the inlet and/or leaving a portion of the beverage medium on the inlet 46 (which may have an affect on the taste of a next beverage made when the inlet 46 pierces a different cartridge having a different type of beverage medium).

In this illustrative embodiment, the flow distributor 33 is formed of a permeable material, such as a filter paper, that is attached to the lid 38 at a location within the periphery 32. Thus, the flow distributor 33 can help prevent the streaming of incoming liquid in a single direction (or two or more specific directions) that might cause the liquid to "tunnel" through the beverage medium 20. Such "tunneling" can cause a short circuit where liquid does not sufficiently interact with the beverage medium 20, resulting in an unacceptably weak product. The flow distributor 33 may take other forms, however, such as a perforated disc placed on the beverage medium 20, a piece of filter paper placed on the beverage medium 20, and others.

Figure 15:
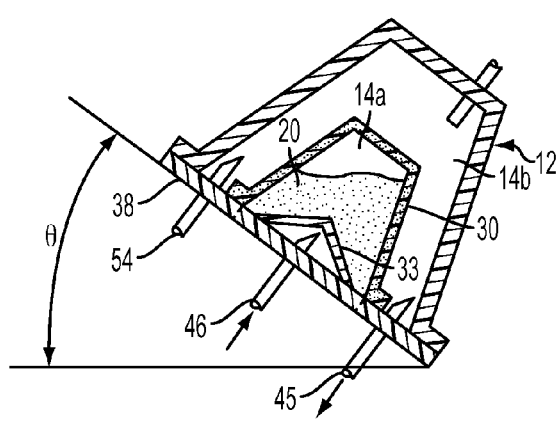
FIG. 15 shows a view of the FIG. 13 cartridge with inlet and outlet elements in communication with the cartridge.

As discussed above and shown in FIG. 15, the cartridge may be used to form a beverage while the cartridge is positioned with the lid 38 below the container 12. Although the cartridge 1 could be used with the lid 38 (or a portion of the lid) lying in a horizontal plane or a vertical plane, some cartridge holder arrangements discussed above position the lid 38 in a plane that is transverse to the horizontal plane, e.g., in a plane that is at an angle θ of about 70 to 80 degrees to the horizontal plane (e.g., so the axis 101 of the cartridge holder opening 3a is about 0-20 degrees below the horizontal). This orientation may provide several advantages including enabling more complete wetting of the beverage medium and/or more complete draining of beverage from the cartridge. The orientation shown in FIG. 5 may enable better wetting or other interaction of liquid introduced into the cartridge with the beverage medium 20 because the liquid may be able to "flood" the interior space of the cartridge 1, e.g., fill the first chamber 14a and at least part of the second chamber 14b with liquid such that all or most of the beverage medium 20 is saturated with the liquid. The cartridge 1 may be provided with a vent that is separate from the beverage outlet that permits the release of gas from the cartridge as it is filled with liquid. The vent may be provided by a one-way valve (e.g., a septum, duck bill valve, or other) that is attached to the lid 38 or container 12 and opens in response to increased pressure in the cartridge 1, may be provided by a piercing element 54 that pierces the lid 38 (as shown in FIG. 15) or container 12 to allow gas and/or liquid to escape, and other arrangements. (Although the element 54 is described as providing a vent for the cartridge 1, the element 54 may provide other functions in addition, or in the alternate, to venting the cartridge. For example, the element 54 may provide an alternate liquid inflow and/or outflow path, and/or may be used to introduce air pressure into the cartridge 1, e.g., to help purge the cartridge 1 of any remaining beverage at the end of a beverage creation cycle. Also, although the element 54 is shown as a single piercing needle, the element 54 may be arranged in other ways like the inlet and outlet elements 46, 45. For example, the element 54 may include one or more blades, tubes, knives, solid or hollow needles, and so on to provide venting, liquid inlet or outlet, and/or purging functions.)

Having the lid 38 in a plane transverse to the horizontal may also allow for better draining of beverage from the cartridge 1. That is, since the cartridge 1 is tilted so that one side of the cartridge is lower than the other, beverage may tend to drain to the lowered side of the cartridge. Also, the beverage outlet opening may be formed at or near this lowered side so that all or most of any liquid in the cartridge 1 can be removed. This feature may provide at least two benefits including reduced dripping or unwanted leakage of liquid when a user removes the cartridge from the beverage machine and/or more complete and efficient usage of the beverage medium since little or no beverage would be left in the cartridge.

Figure 16:
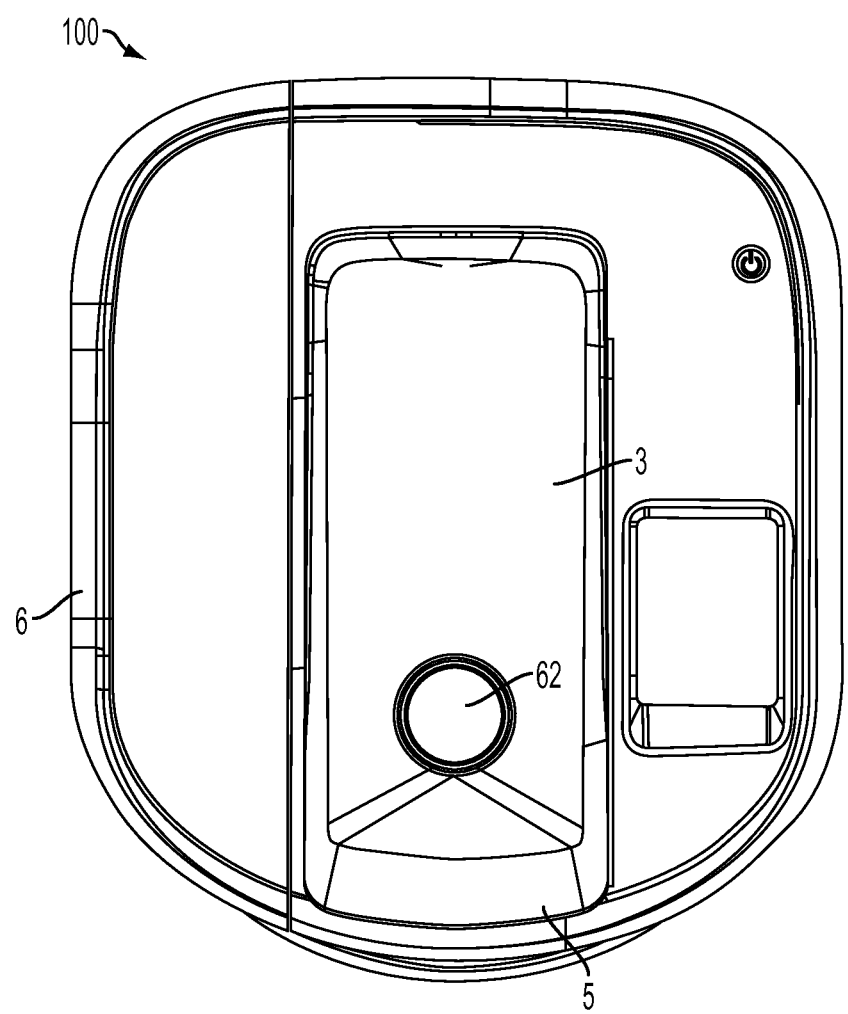
FIG. 16 is a top view of the illustrative embodiment of FIG. 1 with the cartridge holder in a closed position.

Another aspect of the invention shown in FIG. 16 is that a user activatable button 62 or other interface that causes the system 100 to begin a beverage making process is located on the cartridge holder 3. In this embodiment the activation button 62 is located adjacent the handle 5. This feature may make for a system 100 that is easier and more intuitive for a user to operate. For example, a user may find that interacting with a single component of the system 100—the cartridge holder 3—for open and closing, placement and removal of a cartridge, and activating the start of a beverage making process may be simpler and more intuitive than having to interact with several different, separate components of the system 100. Some systems 100 require a user to interact with a handle that is separate from a cartridge holder to open and close the cartridge holder for the placement/ removal of a cartridge. In some cases, a user may find the operation of the opening and closing of the cartridge holder to be confusing, in part because the handle is physically separate from the cartridge holder. Once the cartridge is placed for making a beverage, some systems may require the user to interact with yet another physically separate and distant element to start the brewing process. For users unfamiliar with such a system, operation may be difficult to successfully achieve. However, by having a relatively simple and physically compact configuration of a cartridge holder, handle and activation button 62 all located together may make the user experience less difficult. In the embodiments described herein, a user may simply lift the handle 5 and cartridge holder 3 to expose the opening 3a, place a cartridge in the holder 3, push down on the handle 5 to close the chamber 3, and then press the activation button 62 located relatively close to the handle 5. The simplicity of operation may be particularly advantageous in situations where the system 100 is employed in a public setting, such as in an office or beverage vending environment, where users are interacting with the system 100 on a regular or frequent basis. The button 62 may take any suitable form, such as an activatable switch having an element arranged to be pressed by a user's finger, a touch screen interface, an element that senses the presence of a user's finger whether by capacitance, resistance, voltage, etc., and others.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A beverage forming system, including:
   a frame arranged to support portions of the beverage forming system;
   a cartridge holder movably mounted to the frame and having an opening to receive a cartridge with the cartridge holder in an open position, the cartridge holder arranged to hold and move the cartridge from the open position to a closed position;
   a cover arranged to at least partially cover the opening of the cartridge holder with the cartridge holder in the closed position, and the cover being positioned away from the opening with the cartridge holder in the open position;
   an inlet arranged to provide fluid to a cartridge held by the cartridge holder in the closed position for the formation of a beverage; and
   an activation button mounted on a top of the cartridge holder with the cartridge holder in the closed position, operation of the activation button causing the system to begin a beverage forming process that includes introducing fluid to the cartridge via the inlet.

2. The system of claim 1, wherein the cartridge holder includes a handle that is manipulable by a user to move the cartridge holder between the open and closed positions, and wherein the activation button is adjacent the handle.

3. The system of claim 1, wherein the cartridge holder is arranged so that pushing down on the cartridge holder relative to the frame moves the cartridge holder relative to the frame from the open to the closed position.

4. The system of claim 1, wherein the cartridge holder is mounted to a top portion of the frame.

5. The system of claim 1, wherein with the cartridge holder in the open position, the opening of the cartridge holder is oriented in an upwardly inclined position to receive the cartridge.

6. The system of claim 1, wherein with the cartridge holder in the closed position, the opening of the cartridge holder is oriented in a downwardly inclined position.

7. The system of claim 1, wherein the opening has an axis that is perpendicular to a plane of the opening, and the axis is arranged at an angle of about 30-50 degrees above the horizontal with the cartridge holder in the open position, and the axis is arranged at about 0-20 degrees below the horizontal with the cartridge holder in the closed position.

8. The system of claim 1, further comprising a housing attached to the frame that encloses components of the system, the housing defining a cavity that receives the cartridge holder in the closed position, and wherein the cartridge holder is exposed outside of the cavity in the open position.

9. The system of claim 8, wherein a top portion of the cartridge holder is flush with a top portion of the housing with the cartridge holder in the closed position.

10. The system of claim 9, wherein the activation button is arranged at an uppermost portion of the system with the cartridge holder in the closed position.

11. The system of claim 8, wherein the cartridge holder extends above a top surface of the housing with the cartridge holder in the open position.

* * * * *